United States Patent [19]

Blanken et al.

[11] Patent Number: 4,679,092

[45] Date of Patent: Jul. 7, 1987

[54] REDUCED DISTORTION DISPLAY CIRCUIT

[75] Inventors: Pieter G. Blanken; Pieter van der Zee, both of Eindhoven, Netherlands

[73] Assignee: U.S. Philips Corporation, New York, N.Y.

[21] Appl. No.: 833,631

[22] Filed: Feb. 27, 1986

[30] Foreign Application Priority Data

Mar. 6, 1985 [NL] Netherlands .......................... 8500621
Sep. 27, 1985 [NL] Netherlands .......................... 8502637

[51] Int. Cl.⁴ ............................................. H04N 5/68
[52] U.S. Cl. ..................................... 358/242; 358/243; 358/74; 307/268; 307/270; 330/257; 330/265
[58] Field of Search ................. 358/242, 243, 74, 184; 307/268, 270, 262; 330/255, 257, 260, 265, 293

[56] References Cited

U.S. PATENT DOCUMENTS

| | | | |
|---|---|---|---|
| 3,215,851 | 11/1965 | Warnock .............................. | 307/270 |
| 3,408,585 | 10/1968 | Greeson, Jr. et al. ............... | 330/293 |
| 3,426,245 | 2/1969 | Yurasek et al. ..................... | 330/255 X |
| 3,922,614 | 11/1975 | van de Plassche .................. | 330/257 |
| 3,997,849 | 12/1976 | Thommen ............................ | 330/265 |
| 4,068,187 | 1/1978 | Amada et al. ...................... | 330/255 X |
| 4,072,908 | 2/1978 | Murari et al. ...................... | 330/255 X |
| 4,224,640 | 9/1980 | Hovens et al. ...................... | 358/242 |
| 4,298,886 | 11/1981 | Perkins ............................... | 358/243 X |
| 4,308,555 | 12/1981 | Hovens et al. ...................... | 358/243 |
| 4,446,443 | 5/1984 | Johnson et al. ..................... | 330/265 X |
| 4,502,079 | 2/1985 | Filliman .............................. | 358/74 X |
| 4,536,800 | 8/1985 | Parker ................................. | 358/74 X |
| 4,577,234 | 3/1986 | Harlan ................................ | 358/184 X |
| 4,612,576 | 9/1986 | Hinn ................................... | 358/242 X |
| 4,631,595 | 12/1986 | George ............................... | 358/243 |

*Primary Examiner*—Michael A. Masinick
*Assistant Examiner*—E. Anne Toth
*Attorney, Agent, or Firm*—Thomas A. Briody; William J. Streeter; Gregory P. Gadson

[57] ABSTRACT

The distortion of an emitter-follower output stage of a video amplifier for driving a cathode of a picture display tube can be reduced without rendering a beam current control via this output stage impossible, by using a low-distortion buffer stage for producing a negative feedback signal at the output of the output stage. A higher follow rate for small signal variations can be obtained with the aid of a bias current or quiescent current which then is subtracted again from the current applied to an input of a beam measuring circuit which is controlled by the output stage.

5 Claims, 2 Drawing Figures

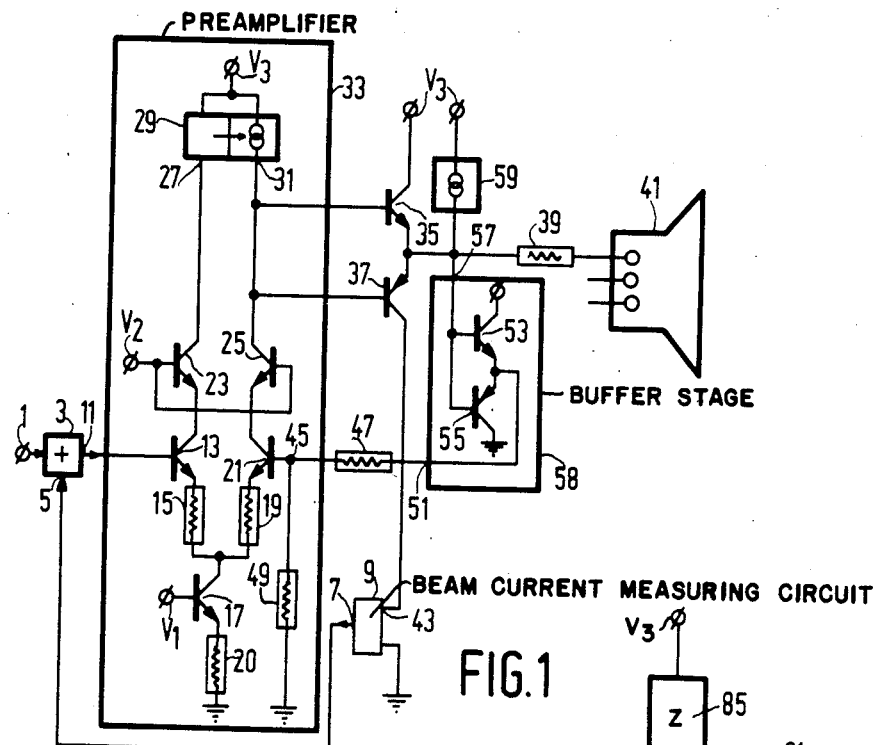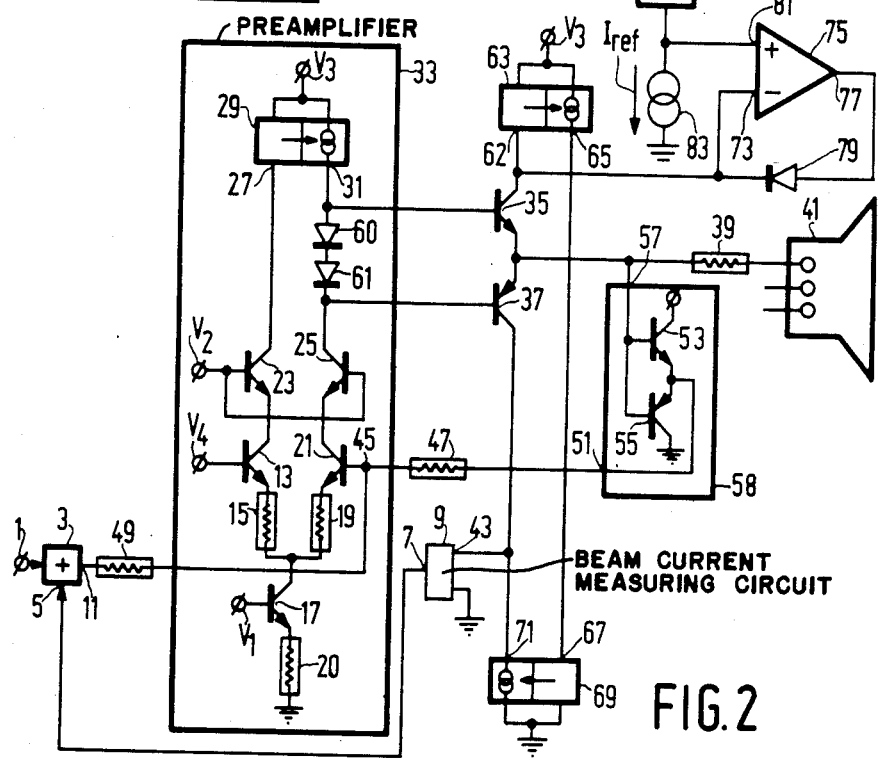

REDUCED DISTORTION DISPLAY CIRCUIT

BACKGROUND OF THE INVENTION

The invention relates to a picture display device comprising a picture display tube a cathode of which is coupled to an emitter-follower drivable by a video preamplifier, a negative feedback signal input of this video preamplifier being coupled to an output of a negative feedback circuit and the collector of the emitter-follower being coupled to an input of a beam current measuring circuit.

Valvo Technische Information 830208 discloses a picture display device of the above-defined type, wherein an input of the negative feedback circuit is connected to an output of the circuit by which the emitter-follower is driven. The direct current flowing in the negative feedback circuit can then not affect the beam current measuring circuit.

It has been found that this circuit cannot satisfy the increasingly higher requirements imposed on the picture quality, as several types of distortions occur which in future might be experienced as annoying.

SUMMARY OF THE INVENTION

The invention has for its object to improve the negative feedback and consequently to produce an improved picture quality while yet the beam current measurement is not affected by the negative feedback.

According to the invention, a picture display device of the type described in the opening paragraph, is therefore characterized in that the negative feedback signal input is coupled to an output of a substantially distortion-free buffer stage which is drivable by the emitter-follower.

The negative feedback causes a low-distortion output signal of the buffer stage and since the buffer stage is substantially free from distortion, the signal applied to the cathode of the picture display tube is likewise free from distortion, while because of its buffering action the buffer stage does substantially not produce any disturbance of the emitter-follower current applied to the beam current measuring circuit. The most significant distortion counteracted thus is what is commonly referred to as the cross-over or take-over distortion produced in circuits operating substantially without quiescent current.

It has been found that a very small distortion still occurs, because of the fact that the predominantly capacitive load causes a slow approach to the desired signal value when the actual signal value deviates little from the desired value. This distortion can also be eliminated in a picture display device, which, in accordance with a further embodiment of the invention, is characterized in that the anti-blocking circuit is a circuit producing an emitter-follower current of the order of magnitude of at least approximately one hundred microamperes, while a current source is coupled to the input of the beam current measuring circuit, for discharging the emitter-follower current.

This measure accomplishes that also signal values which deviate little from the desired values are reached faster, as the current produced by the anti-blocking circuit causes faster recharging of said capacitive load. It has been found, that this measure also causes the current to the beam current measuring circuit to reach the appropriate value more rapidly during a measuring period, so that the beam current measurement becomes more accurate, as a result of which the background color balance is improved in a color picture display device.

BRIEF DESCRIPTION OF THE DRAWINGS

The invention will now be described in greater detail by way of example with reference to the accompanying drawing. In the drawing:

FIG. 1 illustrates by means of a concise circuit diagram a possible embodiment of a picture display device according to the invention, and FIG. 2 illustrates by means of a concise circuit diagram a further possible embodiment of a picture display device according to the invention.

DETAILED DESCRIPTION OF THE INVENTION

In FIG. 1, a video signal is applied to an input 1 of an adder circuit 3. An input 5 of the adder circuit 3 receives from an output 7 of a beam current measuring circuit 9 a d.c. voltage level which is added to the video signal, so that a video signal whose level is controllable by the beam current measuring circuit 9 is obtained at an output 11 of the adder circuit 3.

This video signal is applied to the base of a transistor 13, whose emitter is connected via a resistor 15 to the collector of a transistor 17 and to a resistor 19, whose terminal is connected to the emitter of a transistor 21.

The emitter of the transistor 17, which operates as a current source, is connected to ground via a resistor 20 and its base to an appropriately chosen d.c. voltage $V_1$.

The collectors of the respective transistors 13 and 21 are connected to the emitters of a pair of transistors 23 and 25, whose bases are connected to a d.c. voltage $V_2$. The collector of the transistor 23 is connected to an input 27 of a current mirror circuit 29, which is connected to a supply voltage $V_3$ and whose output 31 is connected to the collector of the transistor 25.

The transistors 13, 17, 21, 23 and 25 constitute together with the resistors 15, 19 and 20 and the current mirror circuit 29 a preamplifier 33.

The output 31 of the current mirror circuit 29 is further connected to the base of a transistor 35 and to the base of a transistor 37. The emitters of the transistors 35 and 37 are interconnected and connected to a cathode of a picture display tube 41 via a resistor 39.

The collector of the transistor 35 is connected to the supply voltage $V_3$ and the collector of the transistor 37 is connected to an input 43 of the beam current measuring circuit 9.

The transistors 35 and 37 form a video output stage which is driven by the preamplifier 33 from the output 31 of the current mirror circuit 29 and from the collector of the transistor 25 by currents which vary in antiphase in response to the video signal at the input 1.

The base of the transistor 21 constitutes an input for a negative feedback signal and is connected to an output 45 of a negative feedback circuit constituted by a series arrangement of a resistor 47 and a resistor 49 to ground. The ouput 45 of this negative feedback circuit is the junction of the resistors 47 and 49, and a further terminal 51 of the resistor 47, which constitutes an input of the negative feedback circuit, is connected to the emitters of two transistors 53, 55 whose bases are connected to the emitters of the transistors 35 and 37.

The bases of these transistors 53 and 55 form an input 57 of a buffer stage 58 which is in the form of a pair of complementary emitter-followers. In this buffer stage the transistor 55 may optionally be replaced by a diode whose anode is connected to the emitter and the cathode to the base of the transistor 53, this combination will alternatively be designated below as a pair of complementary emitter-followers. The buffer stage 58 does substantially not produce any distortion due to its load constituted by the negative feedback circuit 47, 49. Because of the negative feedback via the resistor 47, the signal at the input 51 of the negative feedback circuit, which also constitutes the output of the buffer stage 58, is substantially not distorted, also the signal applied to the cathode of the picture display tube 41 is substantially free from distortion.

A current source 59 which operates as an anti-blocking circuit applies in a customary manner to the emitters of the transistors 35 and 37 a current of approximately 10 micro-amperes which keeps the transistor 37 conductive when the picture display tube 41 produces a leakage current which might cut-off this transistor 37.

If the signal value at the ouput 51 of the buffer stage 58 deviates only little from the desired value, there is, because of the signal at the input 1, substantially no signal current flow through the emitter-followers 35 and 37 and the emitters of the transistors 35, 37 follow small input signal variations comparatively slowly because of the predominantly capacitive loading by the picture display tube 41. As a result thereof, in the case of small signal variations, distortion may be produced in the beam current, which play more specifically a part in the beam current measurement, as a result of which background color errors may occur in a color picture display device. Although these errors are already partially counteracted by the negative feedback, they can be still further reduced by having the current source 59 produce a current which is an order of magnitude greater than the customary current, so approximately one hundred micro-amperes. As then the beam current measurement by the beam current circuit would become substantially impossible, this current must first again be subtracted at the imput 43 of the beam current measuring circuit from the current applied to that input 43, which can be accomplished by connecting a current source to that input 43.

A different method of increasing the rate at which the circuit follows input signal variations when the signal variations are small, is shown in FIG. 2.

In FIG. 2, components corresponding to those shown in FIG. 1 are given the same reference numerals. In this case, the preamplifier 33 is made suitable for processing a different video signal polarity than in FIG. 1, by applying the input signal to the base of the transistor 21 via the resistor 49, which is connected to the output 11 of the adder circuit 3. The base of the transistor 13 is now connected to an appropriate d.c. voltage V4. If so desired, the preamplifiers of FIG. 1 and FIG. 2 can be interchanged.

By means of biasing circuit operating as an anti-blocking circuit, here a series arrangement of two diodes 60, 61 between the collector of the transistor 25 and the output 31 of the current mirror circuit 29, a bias voltage is applied between the bases of the transistors 35 and 37 which, also in the absence of signal variations, maintains a quiescent current of approximately one hundred micro-amperes through the transistors 35 and 37.

This quiescent current takes care that at the occurance of small signal variations an appropriately fast recharging of the load capacitance at the emitters of the transistors 35, 37 is effected, which accomplishes an improved background color control, and that after color transients, no visible after-effects occur.

In order to eliminate the influence of this quiescent current on the beam current measuring circuit 9, the collector current of the transistor 35 is applied to an input 62 of a current mirror circuit 63 an output 65 of which is connected to an input 67 of a further current mirror circuit 69. An output 71 of this further current mirror circuit 69 is connected to the input 43 of the beam current measuring circuit 9, so that the quiescent current does not flow through the beam current measuring circuit and the input 43 of this beam current measuring circuit 9 does substantially only receive the cathode current of the picture display tube 41.

The beam current measuring circuit 9 operates, for example, in the mode as described in the above-mentioned Valvo Publication Technische Information 830208 and produces at its output 7 a control signal which keeps a black level of the beam current of the relevant cathode constant.

So as to limit the dissipation in the current-mirror circuits 63, 69 the current to the input 62 of the current mirror circuit 63 can be limited by connecting said input to a negative feedback input 73 of an amplifier 75, whose output 77 is connected to the negative feedback input 73 via a unidirectionally conducting element 79. The other input 81 of the amplifier 75 is connected to a reference voltage which is preferably generated by a reference current $I_{ref}$, produced by a reference current source 83, flowing through a similar impedance 85 as the input impedance of the current mirror circuit 63. In the case of an excessive current, the unidirectionally conducting element 79, a diode in the present example but which may alternatively be a base-emitter junction of a transistor, forms a negative feedback signal path which keeps the current to the input 62 of the current mirror circuit constant at a value determined by the reference current $I_{ref}$.

The transistors of the circuits may optionally be of a unipolar type. In that case emitter should read source, base should read gate and collector should read drain.

If so desired, the preamplifier 33 and also the buffer stage 58 may be of different constructions. For the order of magnitude of the bias current produced by the current source 59 and the quiescent current produced by the bias voltage network 60, 61, a value of approximately one hundred micro-amperes has been chosen for the above-mentioned cases. It will be obvious that this value may be chosen to be higher, if so desired. A lower value reduces the desired effect.

What is claimed is:

1. A picture display device comprising a picture display tube a cathode of which is coupled to an emitter-follower drivable by a video preamplifier, a negative feedback signal input of the video preamplifier being coupled to an output of a negative feedback circuit and the collector of the emitter-follower being coupled to an input of a beam current measuring circuit, characterized in that the negative feedback signal input is coupled to an output of a substantially distortion-free buffer stage which is drivable by the emitter-follower.

2. A picture display device as claimed in claim 1, in which an anti-blocking circuit is coupled to the cathode of the picture display tube to prevent blocking of the beam current measuring circuit due to leakage currents of the display tube, characterized in that the anti-blocking circuit is a circuit which produces an emitter-follower current of the order of magnitude of at least approximately one hundred micro-amperes, while a current source for discharging the emitter-follower current is coupled to the input of the beam current measuring circuit.

3. A picture display device as claimed in claim 2, characterized in that the emitter-follower is part of a complementary emitter-follower circuit which comprises a further emitter-follower which is complementary to said emitter-follower, the anti-blocking circuit is a bias voltage circuit for the bases of the emitter-followers, and the current source is a further current mirror circuit, an input of which is coupled to an output of a current mirror circuit, an input of said current mirror being coupled to the collector of the complementary emitter-follower.

4. A picture display device as claimed in claim 3, characterized in that the input of the current-mirror circuit is connected to an amplifier negative feedback input of an amplifier whose output is connected to the amplifier negative feedback input via a unidirectionally conducting element and a further input of said amplifier is connected to a connection of a current source and a similar impedance as the impedance of the current-mirror circuit.

5. A picture display device as claimed in anyone of the preceeding claims, characterized in that the buffer stage is a complementary emitter-follower circuit.

* * * * *